US011537872B2

(12) United States Patent
Pham et al.

(10) Patent No.: US 11,537,872 B2
(45) Date of Patent: Dec. 27, 2022

(54) IMITATION LEARNING BY ACTION SHAPING WITH ANTAGONIST REINFORCEMENT LEARNING

(71) Applicant: INTERNATIONAL BUSINESS MACHINES CORPORATION, Armonk, NY (US)

(72) Inventors: Tu-Hoa Pham, Tokyo (JP); Giovanni De Magistris, Tokyo (JP); Don Joven Ravoy Agravante, Tokyo (JP); Ryuki Tachibana, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1185 days.

(21) Appl. No.: 16/048,810

(22) Filed: Jul. 30, 2018

(65) Prior Publication Data
US 2020/0034706 A1   Jan. 30, 2020

(51) Int. Cl.
*G06N 3/08* (2006.01)
*G06N 3/04* (2006.01)

(52) U.S. Cl.
CPC ............ *G06N 3/08* (2013.01); *G06N 3/0472* (2013.01)

(58) Field of Classification Search
CPC ......... G06N 3/08; G06N 3/0472; G06N 5/022
See application file for complete search history.

(56) References Cited

U.S. PATENT DOCUMENTS

| | | | |
|---|---|---|---|
| 8,943,008 B2 | 1/2015 | Ponulak et al. | |
| 9,530,412 B2 | 12/2016 | Selfridge | |
| 9,858,529 B2 | 1/2018 | Adams et al. | |
| 2017/0213150 A1* | 7/2017 | Arel | G06N 3/0427 |
| 2017/0228641 A1 | 8/2017 | Sohn | |
| 2017/0293844 A1 | 10/2017 | Gombolay et al. | |
| 2017/0337682 A1 | 11/2017 | Liao et al. | |
| 2018/0012137 A1 | 1/2018 | Wright et al. | |
| 2019/0019087 A1* | 1/2019 | Fukui | G06K 9/6273 |

FOREIGN PATENT DOCUMENTS

| | | |
|---|---|---|
| CN | 107463878 | 12/2017 |
| EP | 3 242 255 | 8/2017 |

OTHER PUBLICATIONS

Price et al., "Accelerating Reinforcement Learning through Implicit Imitation", 2003, Journal of Artificial Intelligence Research 19 (2003), pp. 569-629. (Year: 2003).*

(Continued)

*Primary Examiner* — Ying Yu Chen
(74) *Attorney, Agent, or Firm* — Tutunjian & Bitetto, P.C.; Randall Bluestone

(57) ABSTRACT

A computer-implemented method, computer program product, and computer processing system are provided for obtaining a plurality of bad demonstrations. The method includes reading, by a processor device, a protagonist environment. The method further includes training, by the processor device, a plurality of antagonist agents to fail a task by reinforcement learning using the protagonist environment. The method also includes collecting, by the processor device, the plurality of bad demonstrations by playing the trained antagonist agents on the protagonist environment.

18 Claims, 8 Drawing Sheets

(56) References Cited

OTHER PUBLICATIONS

Bansal et al., "Emergent Complexity via Multi-Agent Competition", Mar. 14, 2018, arXiv:1710.03748v3, pp. 1-12. (Year: 2018).*
Lin et al., "Explore, Exploiter Listen: Combining Human Feedback and Policy Model to Speed up Deep Reinforcement Learning in 3D Worlds", Sep. 12, 2017, arXiv: 1709.03969, pp. 1-8. (Year: 2017).*
Hwang et al., "Inverse Reinforcement Learning based on Critical State", 2015, 16th World Congress of the International Fuzzy Systems Association (IFSA) 9th Conference of the European Society for Fuzzy Logic and Technology (EUSFLAT), pp. 771-775. (Year: 2015).*
Ma et al., "Improved Robustness and Safety for Autonomous Vehicle Control with Adversarial Reinforcement Learning", Jun. 26-30, 2018, 2018 IEEE Intelligent Vehicles Symposium (IV), pp. 1665-1671. (Year: 2018).*
Achiam et al., "Constrained Policy Optimization", Proceedings of the 34 th International Conference on Machine Learning, Aug. 2017, 18 pages.
Bakker et al., "Hierarchical Reinforcement Learning Based on Subgoal Discovery and Subpolicy Specialization", Proceedings of the 8-th Conference on Intelligent Autonomous Systems, May 2009, 8 pages.
Barto, Andrew G., "Recent Advances in Hierarchical Reinforcement Learning", Discrete Event Dynamic Systems: Theory and Applications (DISC), Kluwer Academic Publishers, Mar. 1999, pp. 41-77.
Berseth et al., "Progressive Reinforcement Learning with Distillation for Multi-Skilled Motion Control", Published as a conference paper at ICLR 2018, May 2018, pp. 1-15.
Duan et al., "Benchmarking Deep Reinforcement Learning for Continuous Control", Proceedings of the 33rd International Conference on Machine Learning, Jun. 2016, 10 pages.
Florensa et al., "Stochastic Neural Networks for Hierarchical Reinforcement Learning", Published as a conference paper at ICLR 2017, Apr. 2017, pp. 1-17.
Pham et al., "OptLayer—Practical Constrained Optimization for Deep Reinforcement Learning in the Real World", arXiv:1709.07643v2 [cs RO] Feb. 23, 2018, 8 pages.
Schlötzer, Susanne, "Hierarchical Reinforcement Learning", Institute of Automatic Control Engineering, Joint Advanced Student School, Mar. 2008, 38 pages.
Argall et al., "A Survey of Robot Learning from Demonstration", Robotics and Autonomous Systems, Oct. 2008, pp. 1-16.
Baram et al., "End-to-End Differentiable Adversarial Imitation Learning", Proceedings of the 34 th International Conference on Machine Learning, Aug. 2017, 10 pages.
Brys et al., "Reinforcement Learning from Demonstration through Shaping", Proceedings of the Twenty-Fourth International Joint Conference on Artificial Intelligence (IJCAI 2015), Jul. 2015, pp. 3352-3358.
Gao et al., "Reinforcement Learning from Imperfect Demonstrations", Proceedings of the 35th International Conference on Machine Learning, Jul. 2018, 13 pages.
Ho et al., "Generative Adversarial Imitation Learning", arXiv:1606.03476v1 [cs.LG] Jun. 10, 2016, pp. 1-14.
Kumar et al., "Rewards-Driven Robot Learning from Demonstrations", EDIC Research Proposal, Nov. 2013, pp. 1-9.
Ng et al., "Algorithms for Inverse Reinforcement Learning", 17th International Conf. on Machine Learning, Feb. 2000, 8 pages.
Ross et al., "A Reduction of Imitation Learning and Structured Prediction to No-Regret Online Learning", Proceedings of the 14th International Conference on Artificial Intelligence and Statistics (AISTATS) 2011, Apr. 2011, pp. 627-635.
Schulman et al., "Trust Region Policy Optimization", Proceedings of the 31st International Conference on Machine Learning, Jun. 2014, 16 pages.
Dalal et al., "Safe Exploration in Continuous Action Spaces", porarXiv: 1801.08757v1 [cs.AI] Jan. 26, 2018, 9 pages.
List of IBM Patents or Patent Applications Treated as Related dated Jul. 30, 2018, 2 pages.
Chen et al., "Decentralized Non-communicating Multiagent Collision Avoidance with Deep Reinforcement Learning", 2017 IEEE International Conference on Robotics and Automation (ICRA), May-Jun. 2017, pp. 285-292.
Hwang et al., "Inverse Reinforcement Learning based on Critical State", 16th World Congress of the International Fuzzy Systems Association (IFSA) 9th Conference of the European Society for Fuzzy Logic and Technology (EUSFLAT), Jun.-Jul. 2015, pp. 771-775.
Johnson et al., "Semi-Supervised Nonlinear Distance Metric Learning via Forests of Max-Margin Clustering Hierarchies", arXiv, Feb. 2014, 11 pages.
Judah et al., "Reinforcement Learning Via Practice and Critique Advice", Proceedings of the Twenty-Fourth AAAI Conference on Artificial Intelligence, Jul. 2010, pp. 481-486.
Zhu et al., "Combining Dynamic Reward Shaping and Action Shaping for Coordinating Multi-Agent Learning", 2013 IEEE/WIC/ACM International Conferences on Web Intelligence (WI) and Intelligent Agent Technology (IAT), Nov. 2013, pp. 321-328.
Datta et al., "Probabilistic Constraint Handling in the Framework of Joint Evolutionary-Classical Optimization with Engineering Applications", Kanpur Genetic Algorithms Laboratory (KanGAL), Mar. 2012, 8 pages.
U.S. Office Action issued in U.S. Appl. No. 16/048,697 dated Oct. 27, 2021, pp. 1-41.

* cited by examiner

IMITATION LEARNING BY ACTION SHAPING WITH ANTAGONIST REINFORCEMENT LEARNING

BACKGROUND

Technical Field

The present invention generally relates to machine learning, and more particularly to imitation learning by action shaping with antagonist reinforcement learning.

Description of the Related Art

Supervised Learning (SL) enables fast policy training from expert demonstration. However, SL typically requires large amounts of data to enable generalization.

Reinforcement learning (RL) can train control policies from high-level task representations. However, while random exploration is important to discover new strategies, it can be overly time-consuming.

Provided good and bad demonstrations, it is possible to learn constraints on the action space by SL in order to accelerate exploration during RL. However, it may be difficult to collect good and bad examples in a balanced way by hand. Instead, it may be easier to collect mostly good demonstrations (e.g., complete successful trajectory) without accompanying bad examples. Hence, there is a need for a way to easily collect mostly bad demonstrations.

SUMMARY

According to an aspect of the present invention, a computer-implemented method is provided for obtaining a plurality of bad demonstrations. The method includes reading, by a processor device, a protagonist environment. The method further includes training, by the processor device, a plurality of antagonist agents to fail a task by reinforcement learning using the protagonist environment. The method also includes collecting, by the processor device, the plurality of bad demonstrations by playing the trained antagonist agents on the protagonist environment.

According to another aspect of the present invention, a computer program product is provided for obtaining a plurality of bad demonstrations. The computer program product includes a non-transitory computer readable storage medium having program instructions embodied therewith. The program instructions are executable by a computer to cause the computer to perform a method. The method includes reading, by a processor device, a protagonist environment. The method further includes training, by the processor device, a plurality of antagonist agents to fail a task by reinforcement learning using the protagonist environment. The method also includes collecting, by the processor device, the plurality of bad demonstrations by playing the trained antagonist agents on the protagonist environment.

According to yet another aspect of the present invention, a computer processing system is provided for obtaining a plurality of bad demonstrations. The computer processing system includes a memory for storing program code. The computer processing system further includes a processor device operatively coupled to the memory for running the program code to read a protagonist environment. The processor device further runs the program code to train a plurality of antagonist agents to fail a task by reinforcement learning using the protagonist environment. The processor device also runs the program code to collect the plurality of bad demonstrations by playing the trained antagonist agents on the protagonist environment.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to imitation learning by action shaping with antagonist reinforcement learning.

In an embodiment, the present invention provides a mechanism for dynamically training neural network agents using good and bad demonstrations/examples to learn state dependent action constraints or action shaping mechanisms based on negative (antagonist) reinforcement learning.

In an embodiment, the present invention provides a mechanism to learn action space constraints given only good examples using antagonist policies. To that end, antagonist policies are trained to perform bad actions over the states visited by the good examples. The converged antagonist policies are used to generate bad demonstrations. Action space constraints are learned from good human demonstrations and antagonist action predictions to guide reinforcement learning on difficult tasks. This enables reinforcement learning in otherwise difficult environments, where autonomous exploration is not enough.

As used herein, the term "constraint" refers to a condition that an action has to satisfy in order to be considered valid with respect to a given task. Such a constraint can be formulated as satisfying a Boolean function that can involve inequalities, equalities, or combinations thereof. Thus, for example, for robotic applications, constraints can include and/or otherwise relate, but are not limited to, avoiding collisions while traveling to a target, maintaining power consumption within a chosen level, and/or fulfilling other performance or safety metrics. For Advanced Driver Assistance Systems (ADAS), constraints can include and/or otherwise relate, but are not limited to, avoiding collisions while traveling to a target, following a chosen route, complying with local speed limits, and other traffic rules. The preceding constraints are merely illustrative and depend upon the application, as readily appreciated by one of ordinary skill in the art given the teachings of the present invention herein, while maintaining the spirit of the present invention.

Thus, one or more embodiments of the present invention advantageously provide the following. Given a protagonist environment $\varepsilon$, construct antagonist environments $\varepsilon_k$ that:

Use a reward structure derived from that of $\varepsilon$ (e.g., opposite of individual protagonist rewards).

Reset each episode to a state visited by the expert demonstrations.

For every antagonist environment $\varepsilon_k$, train antagonist agents $\pi_i^k$ that:

Maximize the expected return in $\varepsilon_k$ with different strategies (e.g., different random seeds).

Generate bad demonstrations by predicting actions using the converged policy on expert states and selecting actions that lead to unrecoverable states.

Figure 1:
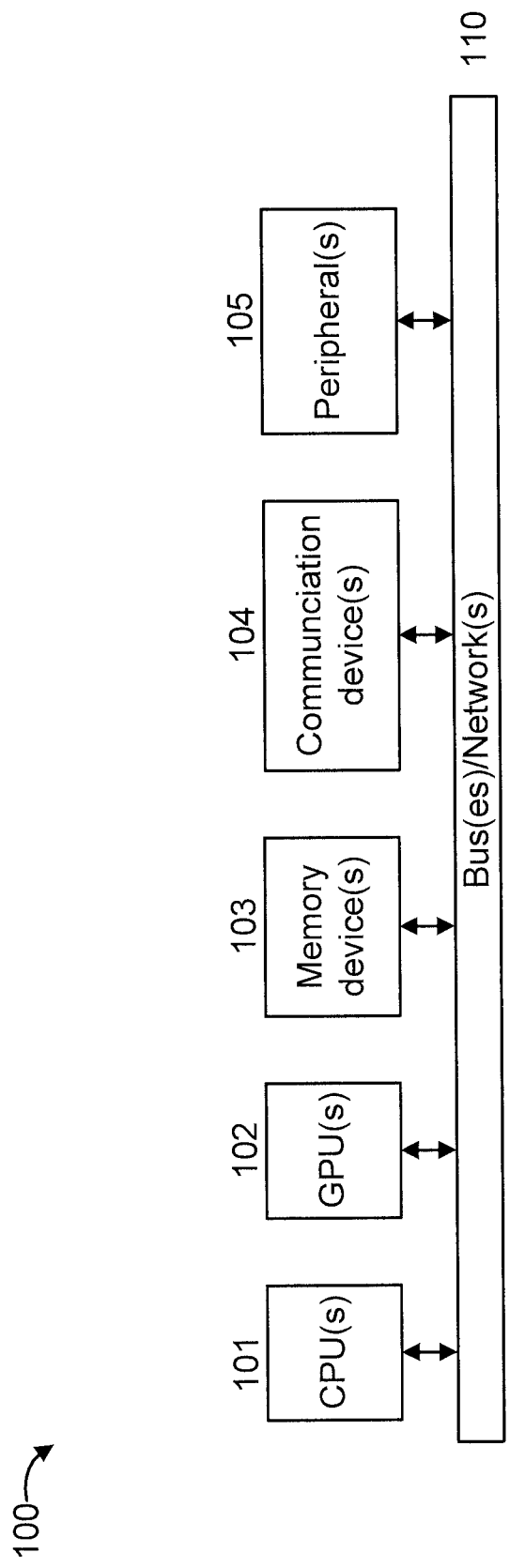
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110). Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 7-8). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
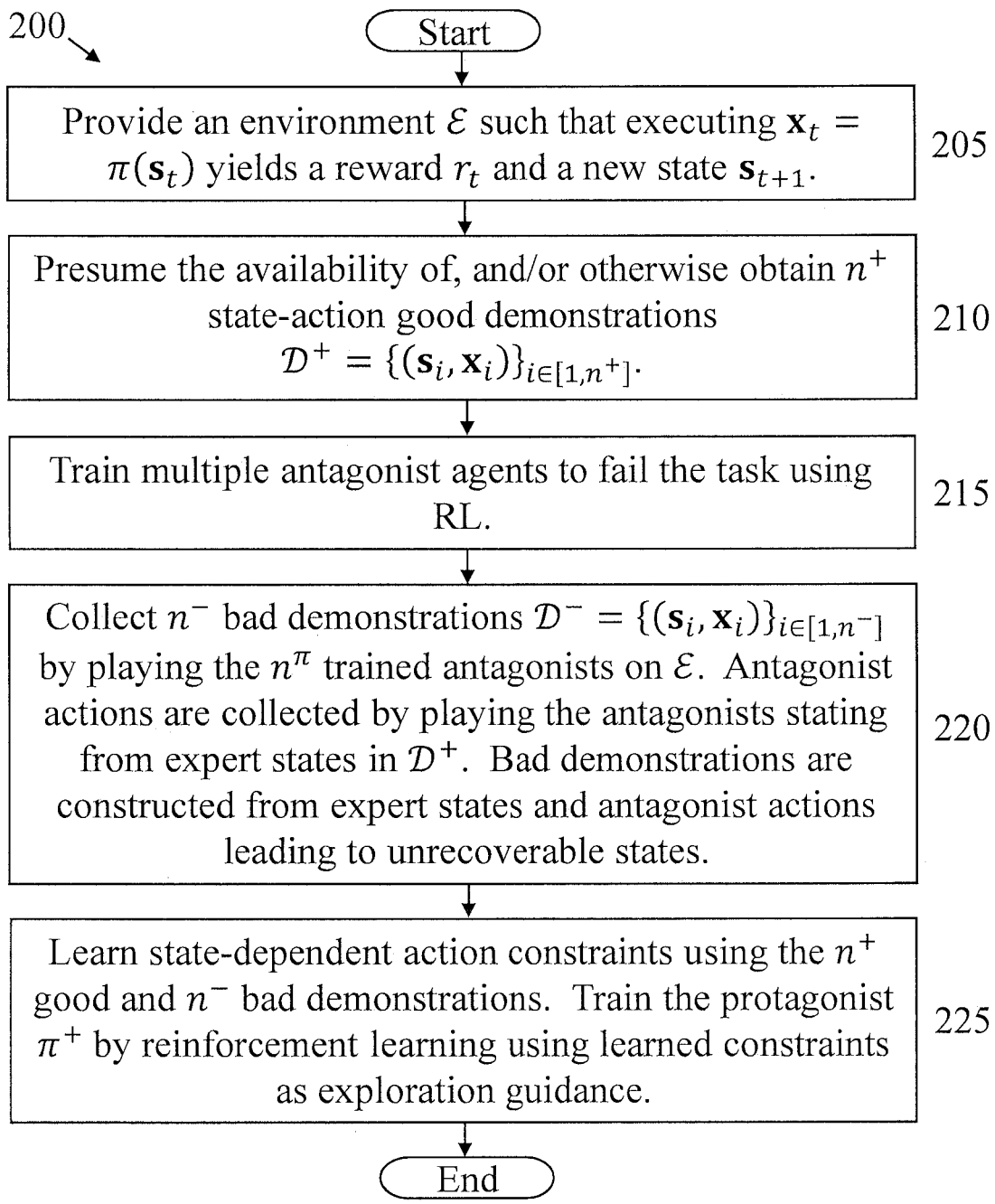
FIG. 2 is flow diagram showing an exemplary method for imitation learning by action shaping with antagonistic reinforcement learning, in accordance with an embodiment of the present invention.

FIG. 2 is flow diagram showing an exemplary method 200 for imitation learning by action shaping with antagonistic reinforcement learning, in accordance with an embodiment of the present invention. Method 200 of FIG. 2 can be considered a more general representation of method 400 of FIG. 4.

At block 205, provide an environment $\varepsilon$ such that executing $x_t = \pi(s_t)$ yields a reward $r_t$ and a new state $s_{t+1}$.

Goal: learn a policy $\pi^+$ that maximizes the $\gamma$-discounted expected return $\eta(\pi^+) = \mathbb{E}[\Sigma_{t=0}^{\infty} \gamma^t r_t]$, with $\tau = (s_0, x_0, r_0, \ldots)$ state-action-reward trajectories obtained by following $x_t = \pi^+(s_t)$ in $\varepsilon$.

At block 210, presume the availability of, and/or otherwise obtain $n^+$ state-action good demonstrations $\mathcal{D}^+ = \{(s_i, x_i)\}_{i \in [1,n^+]}$. A good demonstration is a state-action pair produced by an expert to solve the task (a protagonist). A bad demonstration is a state-action pair produced by an agent to fail the task (an antagonist).

At block 215, train multiple antagonist agents to fail the task using RL.

Given the protagonist environment $\varepsilon$, define $n^\varepsilon$ antagonist environments $(\varepsilon_k)_{k \in [1,n^\varepsilon]}$. For example:

Each $\varepsilon_k$ uses the same state and action transition functions as $\varepsilon$ (i.e., same dynamic model).

Each $\varepsilon_k$ uses a reward structure derived from that of $\varepsilon$. In most cases, antagonist rewards can be derived as negative of the individual protagonist rewards.

Each episode of $\varepsilon_k$ starts by resetting the environment to a state visited by the expert in $\mathcal{D}^+$.

For each $\varepsilon_k$, we train antagonist agents $(\pi_i^k)_{i \in [1,n_k^\pi]}$ on $n_k^\pi$ instances of $\varepsilon_k$ (e.g., different seeds).

In total, we thus obtain $n^\pi = \Sigma_{k=1}^{n\varepsilon} n_k^\pi$ antagonist agents At block 220, collect $n^-$ bad demonstrations $\mathcal{D}^- = \{(s_i, x_i)\}_{i \in [1,n^-]}$ by playing (deploying) the $n^\pi$ trained antagonists on $\varepsilon$. Antagonist actions are collected by playing the antagonists starting from expert states in $\mathcal{D}^+$. Bad demonstrations are constructed from expert states and antagonist actions leading to unrecoverable states.

At block 225, learn state-dependent action constraints using the $n^+$ good and $n^-$ bad demonstrations. Train the protagonist $\pi^+$ by reinforcement learning using learned constraints as exploration guidance.

Figure 3:
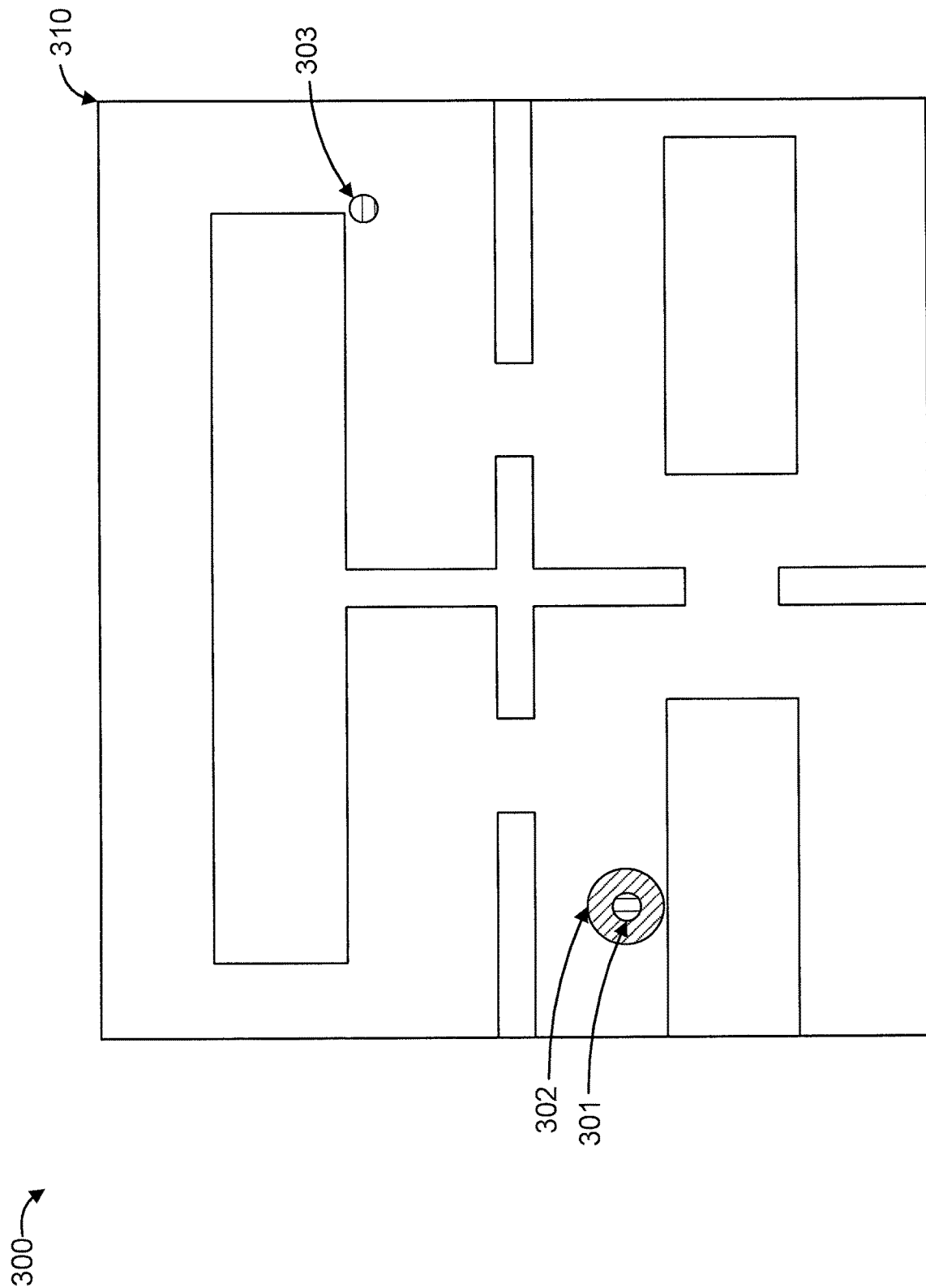
FIG. 3 is a block diagram showing an exemplary environment to which the present invention can be applied, in accordance with an embodiment of the present invention.

FIG. 3 is a block diagram showing an exemplary environment 300 to which the present invention can be applied, in accordance with an embodiment of the present invention. The environment 300 includes a two-dimensional (2D) maze 310 with continuous actions, as follows:

Goal: move agent $(x_a, y_a)$ to target $(x_t, y_t)$ without touching walls or exiting the environment borders $[-1,1] \times [-1,1]$ State of dim $n^s = 4$: agent position, target relative position $s = (x_a, y_a, x_t - x_a, y_t - y_a)$ Action of dim $n^x = 2$: agent position increment $(\Delta x_a, \Delta y_a)$ $x = (\Delta x_a, \Delta y_a)$ Regarding data collection, the following applies:
Circle with vertical hatching: agent 301.
Circle with horizontal hatching: target 302.
Circle with diagonal hatching: action range 303.
Solid line: good action.

Figure 4:
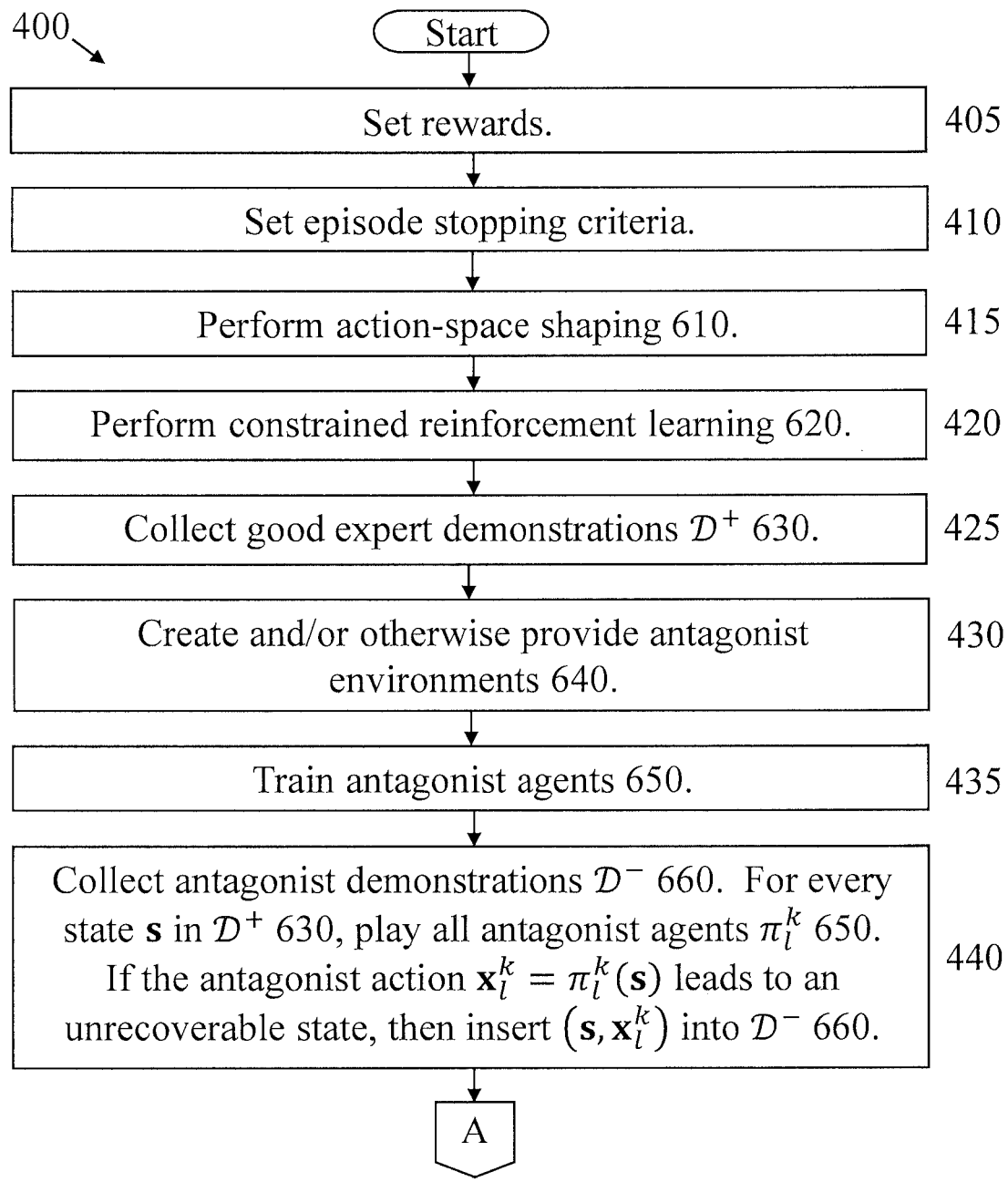
FIGS. 4-5 are flow diagrams showing an exemplary method for imitation learning by action shaping with antagonist reinforcement learning, in accordance with an embodiment of the present invention.
Figure 5:
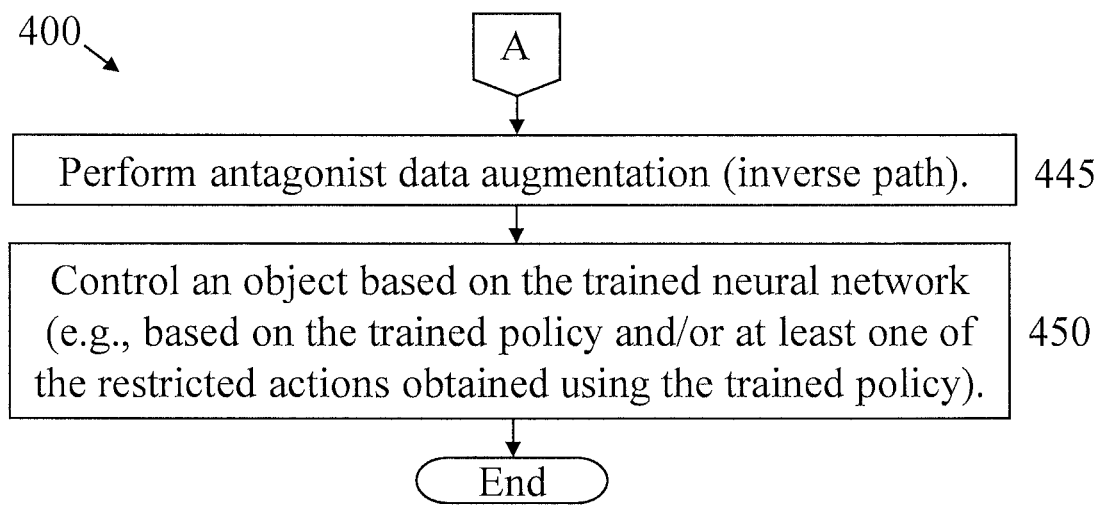
Figure 6:
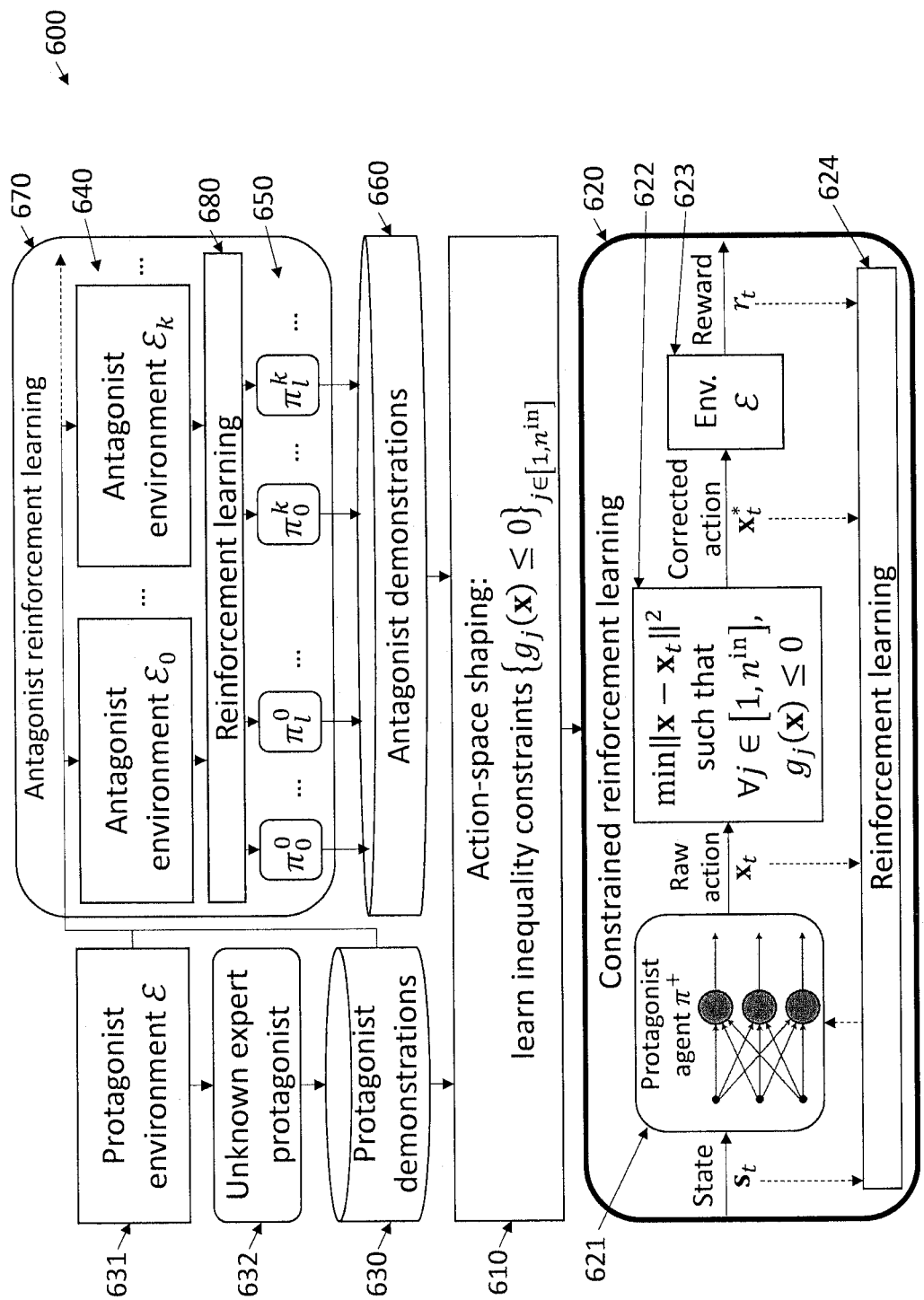
FIG. 6 is a high-level block diagram showing an exemplary system for imitation learning by action shaping with antagonist reinforcement learning, in accordance with an embodiment of the present invention.

FIGS. 4-5 are flow diagrams showing an exemplary method 400 for imitation learning by action shaping with antagonist reinforcement learning, in accordance with an embodiment of the present invention. FIG. 6 is a high-level block diagram showing an exemplary system 600 for imitation learning by action shaping with antagonist reinforcement learning, in accordance with an embodiment of the present invention. For the sake of illustration, the method 400 is described with respect to environment 300 and system 600. However, other environments can also be used, as readily appreciated by one of ordinary skill in the art, given the teachings of the present invention provided herein, while maintaining the spirit of the present invention.

Referring to FIGS. 3-6, at block 405, set rewards. In an embodiment, the rewards can be set as follows:

Reward: $r^\varepsilon = r_{dist} + r_{target} + r_{wall} + r_{exit}$

Distance reward $$r_{dist} = -\sqrt{(x_t - x_a)^2 + (y_t - y_a)^2}$$

If the agent touches the target, bonus $r_{target}=100$.
If the agent touches a wall, penalty $r_{wall}=-200$.
If the agent exits borders, penalty $r_{exit}=-200$ At block 410, set episode stopping criteria. For example, stop the episode if agent reaches target, touches a wall, exits borders, or after T=100 steps.

At block 415, perform action-space shaping 610.

In an embodiment, block 415 can involve training a neural network $\mathcal{N}$ to predict $n^{in}$ constraints of the form $g_j(x) \leq 0$, $j \in [1, n^{in}]$. In an embodiment, $g_j$ are real-valued functions parameterized by $\theta^{g_j}$, with $(\theta^{g_j})_{j \in [1, n^{in}]} = \mathcal{N}(s)$. In an embodiment, block 415 can involve training $\mathcal{N}$ by supervised learning such that good demonstrations satisfy all constraints and bad demonstrations violate at least one constraint as follows:

$$\forall (s,x) \in \mathcal{D}^+, \forall j \in [1, n^{in}], g_j(x) \leq 0; \text{ and}$$

$$\forall (s,x) \in \mathcal{D}^-, \exists j \in [1, n^{in}], g_j(x) > 0.$$

In an embodiment, action-space shaping can involve the following.

Learn constraints of the form $Gx - h \leq 0$, with $G$ of size $n^{in} \times n^x$ and $h$ of size $n^{in}$ (e.g., $n^{in}=2$).

Violation margin $M^-(s,x) = \max(0, Gx - h)$, satisfaction margin $M^+(s,x) = \max(0, h - Gx)$, $\delta(x) = 1$ if $x \in \mathcal{D}^+$ else 0.

Neural network loss $l(s,x) = \delta(x) \max\{M^-(s,x)\} + (1-\delta(x)) \min\{M^+(s,x)\}$ At block 420, perform constrained reinforcement learning 620. To that end:

Given a state $s_t$, predict 621 $x_t = \pi^+(s_t)$ and $(\theta^{g_j})_{j=1, \ldots, n^{in}} = \mathcal{N}(s_t)$.

By numerical optimization 622, compute $x_t^* = \mathrm{argmin}_x \|x - x_t\|^2$ such that $\forall j, g_j(x) \leq 0$.

Execute $x_t^*$ on the environment 623 to obtain a reward $r_t$ and a new state $s_{t+1}$.

Train $\pi^+$ by reinforcement learning 624 using the state-action-reward trajectories $(s_t, x_t, x_t^*, r_t)_{t \in [1,T]}$.

At block 425, collect good expert demonstrations $\mathcal{D}^+$ 630.

For example, collect $n^{traj}$ good trajectories starting from random agent and target positions (e.g., $n^{traj}=500$, by human demonstration). The value of 500 for $n^{traj}$ is used for the sake of illustration and, thus, other values can also be used. Hence, in an embodiment, the good expert demonstrations $\mathcal{D}^+$ 630 are obtained from a protagonist environment $\varepsilon$ 631 and an unknown expert protagonist 632.

At block 430, create and/or otherwise provide antagonist environments 640. To that end, collect bad actions as actions that lead to unrecoverable states. Such bad actions can include, but are not limited to, a collision with a wall, exiting the world, and so forth.

In an embodiment, the antagonist environments 640 are created with same state and action spaces as $\varepsilon$ but separate opposite rewards. Thus, the following can apply:

$\varepsilon_{wall}$:reward $r^\varepsilon = -r_{wall} = +200$ if collision, else 0
$\varepsilon_{exit}$:reward $r^\varepsilon = -r_{exit} = +200$ if agent exits, else 0

Regarding block 430, each episode starts by resetting the environment 640 to a state visited by the expert demonstrations $\mathcal{D}^+$.

At block 435, train antagonist agents 650. In an embodiment, for each antagonist environment $\varepsilon_k \in \{\varepsilon_{wall}, \varepsilon_{exit}\}$, train $n_k^\pi = 10$ agents 650 on different random seeds. Of course, other numbers of agents 650 can be trained, depending upon the implementation. Here, agents 650 are stochastic neural network policies $\pi_l^k$. In an embodiment, the Trust Region Policy Optimization (TRPO) algorithm can be used to update the neural networks with state-action-reward sequences $(s_t, x_t, r_t)_{t=0, \ldots, T}$ from $\varepsilon_k$. Of course, other techniques/algorithms can also be used, while maintaining the spirit of the present invention.

At block 440, collect antagonist demonstrations $\mathcal{D}^-$ 660. For every state $s$ in $\mathcal{D}^+$ 630, play all antagonist agents $\pi_l^k$ 650. If the antagonist action $x_l^k = \pi_l^k(s)$ leads to an unrecoverable state, then insert $(s, x_l^k)$ into $\mathcal{D}^-$ 660. It is to be appreciated that the general process of antagonist reinforcement learning 670 refers to the combined process of constructing antagonist environments 640 and training antagonist agents 650 using reinforcement learning 680 in order to yield antagonist demonstrations 660.

At block 445, perform antagonist data augmentation (inverse path). For example, in an embodiment, if $(s_t, x_t) \in \mathcal{D}^+$ leads to $s_{t+1}$, then add $(s_{t+1}, -x_t)$ into $\mathcal{D}^-$.

At block 450, control an object using a neural network trained on one or more of the bad demonstrations and/or the trained protagonist $\pi^+$ and/or the trained antagonistic agents. The object can be, for example, but not limited to, a hardware object. The hardware object can be, but is not limited to, a computer, a workplace machine, a robot, a vehicle (e.g., a car, etc.), and so forth. The action can be performed to, for example, make the robot perform an operation (such as manufacturing another object), controlling the workplace machine to mitigate a potential harm to a user thereof, and so forth. In an embodiment, the restricted action provides a better result than if the action was not restricted in accordance with the present invention. For example, in the case of reaching a target, the restricted action can result in reaching the target faster than an corresponding unrestricted version of the action (e.g., by avoiding a path having extra unnecessary steps in order to arrive at a target location and/or target object). In the case of a computer, the action can be to bypass a computer operation that is likely not to improve an outcome provided by the computer in order to improve operation of the computer by avoiding wasting resources that would otherwise be consumed by performing the bypassed operation. These and other actions are readily contemplated by one of ordinary skill in the art, given the teachings of the present invention provided herein, while maintaining the spirit of the present invention.

A description will now be given regarding some exemplary applications to which the present invention can be applied, in accordance with an embodiment of the present invention.

For example, the present invention can be used for robotics applications, a music recommendation system, factory management, garbage combustion, Advanced Driver Assistance Systems (ADAS), and so forth.

Further regarding robotics applications, the present invention can be applied to optimize balance, optimize maze solving, and so forth.

Further regarding a music recommendation system, the present invention can be used to minimize the user skipping songs, maximize the available and/or played "song variety", and so forth.

Further regarding factory management, the present invention can be used to keep production quality above a certain level, minimize energy costs, maximize worker happiness, and so forth.

Further regarding garbage combustion, the present invention can be used to maintain temperature at a certain level, minimize garbage segregation work, and so forth.

Further regarding ADAS, the present invention can be used to avoid collisions, control vehicle systems (e.g., in order to arrive at a target destination and/or to avoid collisions). The vehicle functions that can be controlled include, but are not limited to, acceleration, braking, steering, and so forth.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
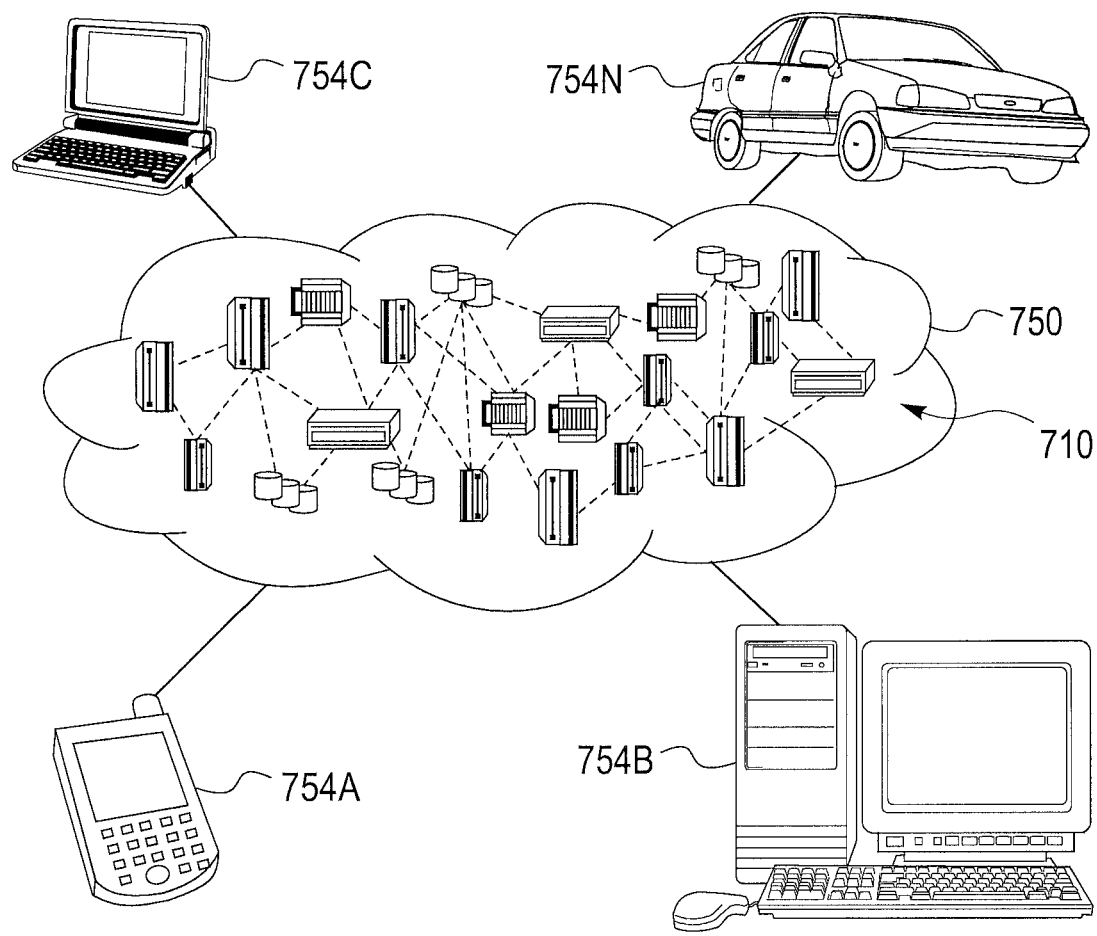
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
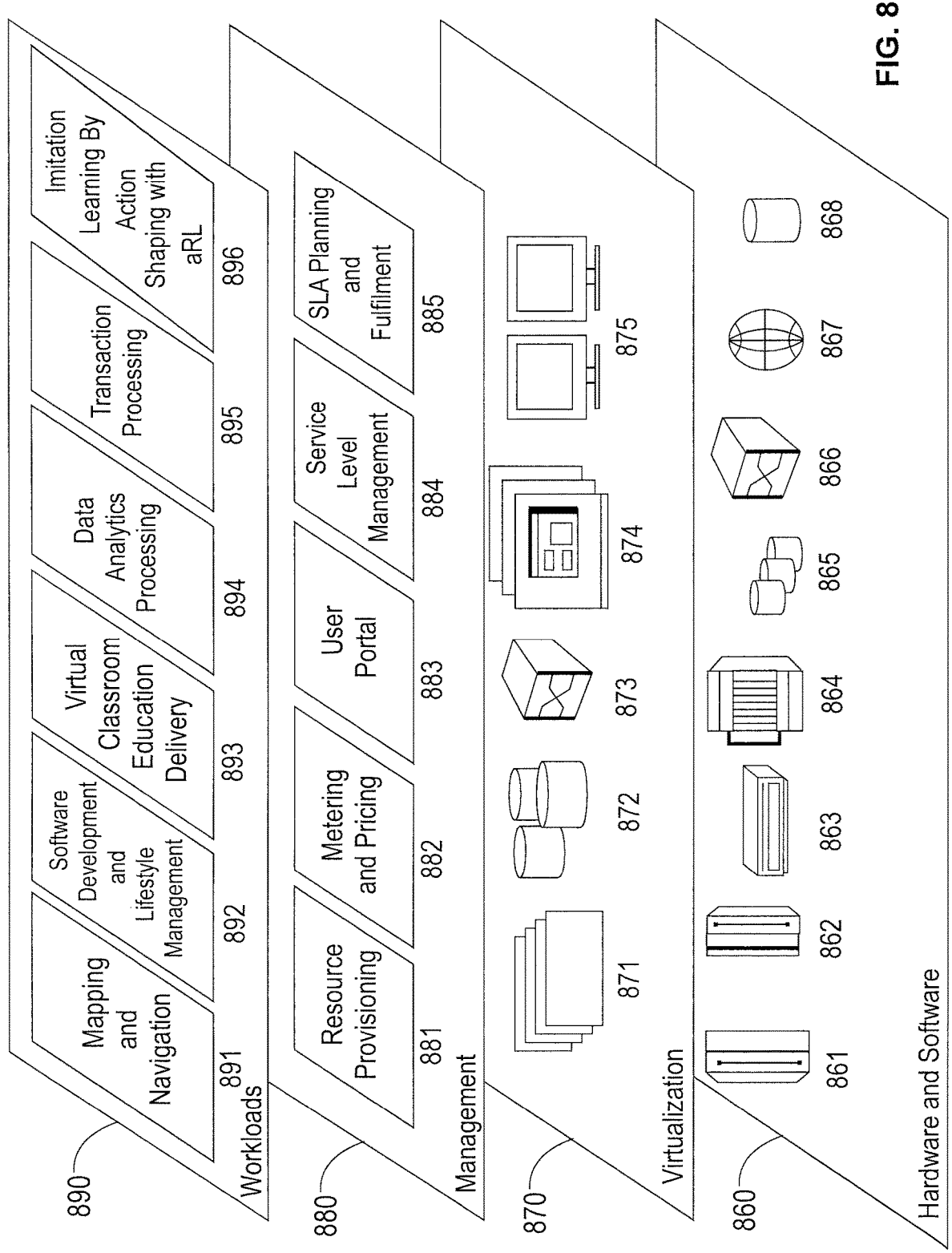
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and imitation learning by action shaping with antagonist Reinforcement Learning (aRL) 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for obtaining a plurality of bad demonstrations, comprising:
    reading, by the processor device, a protagonist environment;
    training, by the processor device, a plurality of antagonist agents to fail a task by reinforcement learning using the protagonist environment to generate trained antagonist agents;
    collecting, by the processor device, the plurality of bad demonstrations by playing the trained antagonist agents on the protagonist environment;
    training a neural network with one or more of the plurality of bad demonstrations from the trained antagonist agents to generate a trained neural network; and
    controlling a vehicle system to control a vehicle to avoid a collision based on outputs from the trained neural network,
    wherein training the plurality of antagonist agents comprises:
    resetting a plurality of antagonist environments using the protagonist environment; and
    training the plurality of antagonist agents on a plurality of instances of each of the plurality of antagonist environments.

2. The computer-implemented method of claim 1, wherein resetting the plurality of antagonist environments comprises resetting the plurality of antagonist environments to a visited expert state in a protagonist demonstration.

3. The computer-implemented method of claim 1, wherein the protagonist environment includes state and action transition functions and reward structure information, and wherein resetting the plurality of antagonist environments comprises using, for each of the plurality of antagonist environments, (i) a same one of the state and action transition functions as the protagonist environment, (ii) a reward structure derived from that of the protagonist environment, and (iii) using visited states of the protagonist environment as an initial state.

4. The computer-implemented method of claim 3, wherein the reward structure derived from that of the protagonist environment includes a negative of a protagonist reward.

5. The computer-implemented method of claim 1, further comprising learning state-dependent action constraints using the plurality of bad demonstrations and a plurality of good demonstrations.

6. The computer-implemented method of claim 5, further comprising training a protagonist policy by reinforcement learning using the state-dependent action constraints for exploration guidance.

7. The computer-implemented method of claim 1, wherein each of the trained antagonist agents is a respective stochastic neural network policy.

8. The computer-implemented method of claim 1, wherein the plurality of antagonist agents are trained to maximize an expected return in at least one antagonist environment constructed from the protagonist environment, using different random seeds corresponding to different strategies.

9. The computer-implemented method of claim 1, wherein playing the trained antagonist agents on the protagonist environment comprises constructing the plurality of bad demonstrations from expert states in protagonist demonstrations and antagonistic actions leading to unrecoverable states, and wherein the antagonistic actions leading to unrecoverable states comprise a vehicle collision.

10. The computer-implemented method of claim 1, wherein antagonistic rewards are derived as a negative of individual protagonist rewards.

11. A computer program product for obtaining a plurality of bad demonstrations, the computer program product comprising a non-transitory computer readable storage medium having program instructions embodied therewith, the program instructions executable by a computer to cause the computer to perform a method comprising:
    reading, by the processor device, a protagonist environment;
    training, by the processor device, a plurality of antagonist agents to fail a task by reinforcement learning using the protagonist environment to generate trained antagonist agents;
    collecting, by the processor device, the plurality of bad demonstrations by playing the trained antagonist agents on the protagonist environment;
    training a neural network with one or more of the plurality of bad demonstrations from the trained antagonist agents to generate a trained neural network; and
    controlling a vehicle system to control a vehicle to avoid a collision based on outputs from the trained neural network,
    wherein training the plurality of antagonist agents comprises:
    resetting a plurality of antagonist environments using the protagonist environment; and
    training the plurality of antagonist agents on a plurality of instances of each of the plurality of antagonist environments.

12. The computer program product of claim 11, wherein resetting the plurality of antagonist environments comprises resetting the plurality of antagonist environments to a visited expert state in a protagonist demonstration.

13. The computer program product of claim 11, wherein the protagonist environment includes state and action transition functions and reward structure information, and wherein resetting the plurality of antagonist environments comprises using, for each of the plurality of antagonist environments, (i) a same one of the state and action transition functions as the protagonist environment, (ii) a reward structure derived from that of the protagonist environment, and (iii) using visited states of the protagonist environment as an initial state.

14. The computer program product of claim 13, wherein the reward structure derived from that of the protagonist environment includes a negative of a protagonist reward.

15. The computer program product of claim 11, wherein the method further comprises learning state-dependent action constraints using the plurality of bad demonstrations and a plurality of good demonstrations.

16. The computer program product of claim 15, wherein the method further comprises training a protagonist policy by reinforcement learning using the state-dependent action constraints for exploration guidance.

17. The computer program product of claim 11, wherein each of the trained antagonist agents is a respective stochastic neural network policy.

18. A computer processing system for obtaining a plurality of bad demonstrations, comprising:
    a memory for storing program code; and
    a processor device operatively coupled to the memory for running the program code to read a protagonist environment;
    train a plurality of antagonist agents to fail a task by reinforcement learning using the protagonist environment to generate trained antagonist agents;
    collect the plurality of bad demonstrations by playing the trained antagonist agents on the protagonist environment;
    train a neural network with one or more of the plurality of bad demonstrations from the trained antagonist agents to generate a trained neural network; and
    control a vehicle system to control a vehicle to avoid a collision based on outputs from the trained neural network,
    wherein train the plurality of antagonist agents comprises:
    reset a plurality of antagonist environments using the protagonist environment; and
    train the plurality of antagonist agents on a plurality of instances of each of the plurality of antagonist environments.

* * * * *